F. EVANS.
ICE SCRAPER.
APPLICATION FILED JULY 29, 1908.

920,446.

Patented May 4, 1909.
2 SHEETS—SHEET 1.

WITNESSES

INVENTOR.
FRANK EVANS
BY A. C. Paul
HIS ATTORNEY

F. EVANS.
ICE SCRAPER.
APPLICATION FILED JULY 29, 1908.
920,446.
Patented May 4, 1909.
2 SHEETS—SHEET 2.
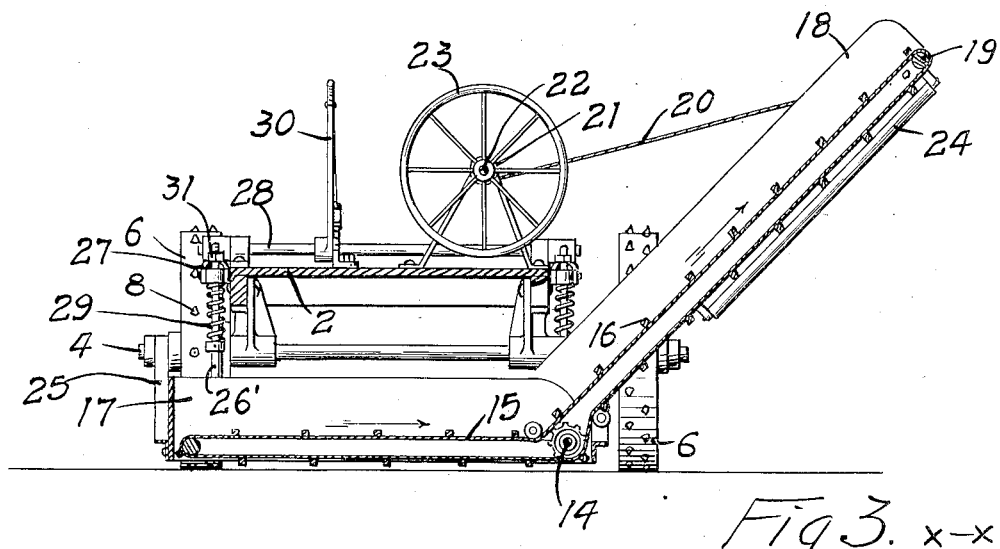
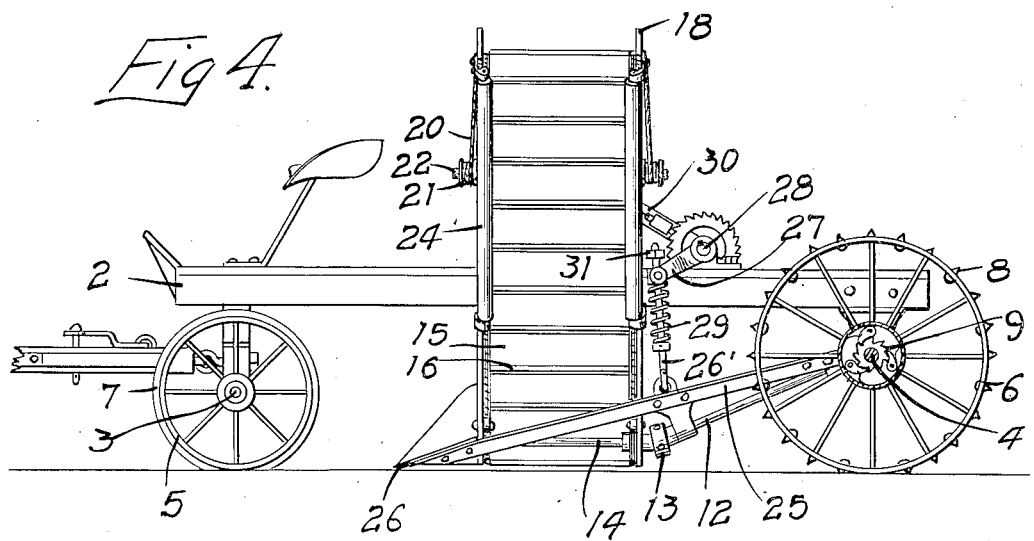

UNITED STATES PATENT OFFICE.

FRANK EVANS, OF MINNEAPOLIS, MINNESOTA.

ICE-SCRAPER.

No. 920,446.      Specification of Letters Patent.      Patented May 4, 1909.

Application filed July 29, 1908. Serial No. 445,854.

*To all whom it may concern:*

Be it known that I, FRANK EVANS, of Minneapolis, Hennepin county, Minnesota, have invented certain new and useful Improvements in Ice-Scrapers, of which the following is a specification.

My invention relates to machines for cleaning or scraping the surface of an ice field preparatory to cutting the same, and the object of the invention, is to provide a machine by means of which the snow can be easily and quickly gathered up and delivered to a sled box moving along beside of or with the machine.

A further object is to provide a machine having a large capacity and one that will be economical to operate and maintain.

The invention consists generally of various constructions and combinations, all as hereinafter described and particularly pointed out in the claims.

Figure 2:
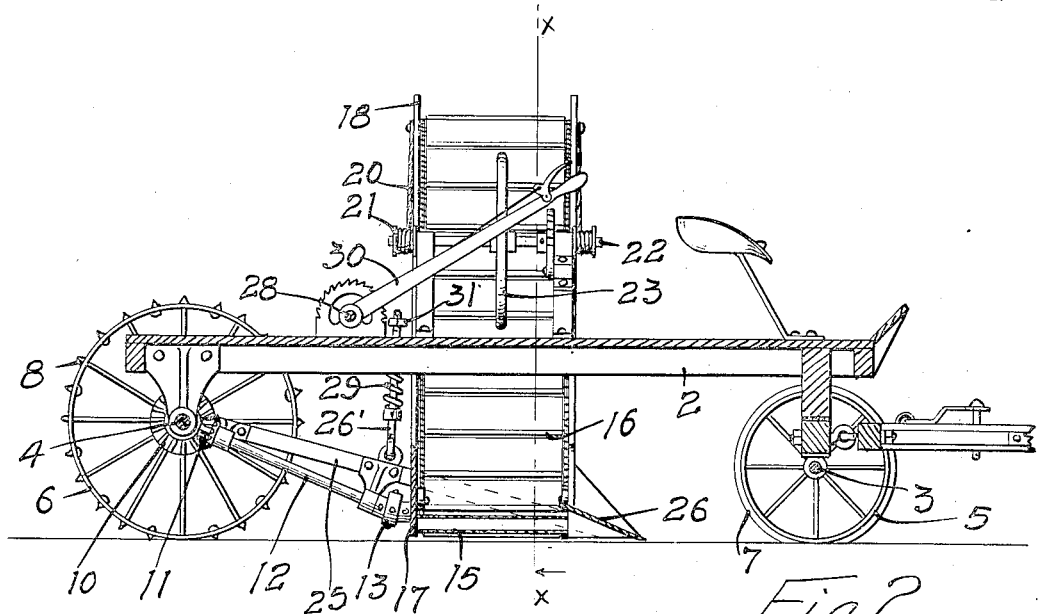
Figure 1:
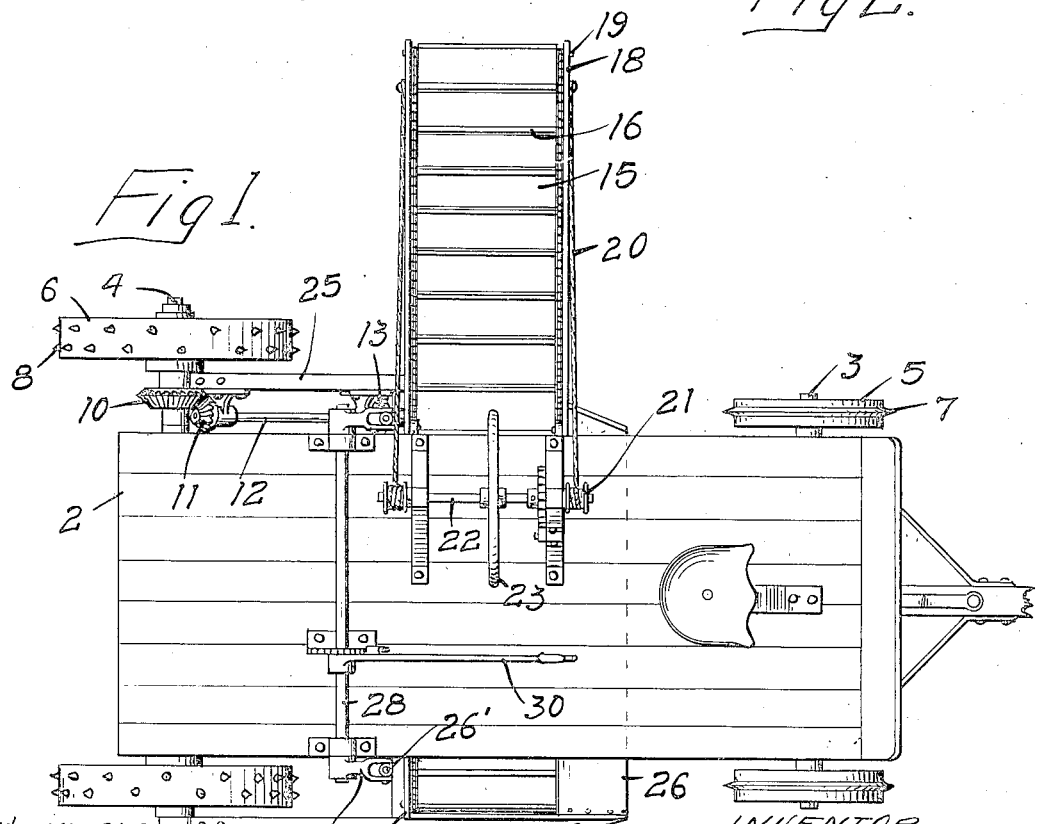

In the accompanying drawings forming part of this specification, Figure 1, is a plan view of an ice scraper machine embodying my invention, Fig. 2, is a longitudinal vertical sectional view of the same, Fig. 3, is a transverse sectional view on the line $x—x$ of Fig. 2, Fig. 4, is a side elevation, partially in section looking toward the discharge end of the side delivery conveyer.

In the drawing, 2 represents a suitable platform having forward and rear axles 3 and 4 provided with carrying wheels 5 and 6. The forward wheels have flanges 7 on their peripheries and the rear wheels have spurs 8 to prevent the machine from slipping or skidding on the ice. The rear wheels are loose on the axle having the usual ratchet connection 9 therewith and said axle is provided with a beveled gear 10 meshing with a pinion 11 on a shaft 12 which has a knuckle joint connection 13 with a shaft 14 from which an apron 15 provided with a series of cross slats 16 is driven. This apron operates in a box 17 and a frame 18 is hinged at its lower end on the shaft 14 and is provided with a shaft 19 around which the conveyer belt passes. The frame 18 is capable of swinging on its pivot and is raised and lowered by means of cables 20 and drums 21, mounted on a shaft 22 and having an operating wheel 23. Rollers 24 are preferably mounted on the under side of the frame 18 lengthwise thereof in position to engage the wall of the sled box into which the snow is discharged, and prevent damage to the slats of the conveyer. A frame 25 is hinged on the rear axle and projects forwardly therefrom over the horizontal portion of the conveyer and a scraper blade 26 is mounted on said frame and provided with a cutting edge adapted to rest on the ice and scrape up the snow and deliver it upon the horizontal portion of the conveyer. Said scraper blade is held down to the work by means of rods 26′ arranged to slide in crank arms 27 on a shaft 28. Springs 29 are provided on said rods and are put under tension by the depression of the arms 27. An operating lever 30 is mounted on said shaft by means of which the attendant can force the frame 25 downwardly and hold the scraper blade in contact with the ice with a yielding pressure. Burs 31 are provided on the rods 26′ to be engaged by the crank arms 27 when said arms are raised for the purpose of lifting the said frame and raising the scraper blade out of contact with the ice.

In the operation of the machine, the scraper blade having been lowered, the snow will be cleaned off the ice and delivered to the horizontal portion of the conveyer by which it is elevated and discharged into a box or other receptacle that is moved along beneath the inclined portion of the conveyer.

I claim as my invention:

1. The combination with a wheeled frame, of a side delivery conveyer mounted therein and comprising a transversely operating horizontal portion, said conveyer having a driving connection with the machine axle, a snow scraper blade arranged in front of the horizontal portion of said conveyer and means for holding said scraper downwardly with a yielding pressure, substantially as described.

2. The combination with a wheeled frame, of a side delivery conveyer mounted therein and comprising a horizontal and an upwardly inclined portion, means for operating said conveyer a frame, a snow scraper blade mounted on said frame in advance of said horizontal side delivery portion, and adapted to gather up the snow and deliver it upon said side delivery portion and means for raising or lowering said scraper blade and said frame.

3. The combination with a frame, having carrying wheels, of a side delivery conveyer comprising a horizontal and an upwardly inclined portion, a frame projecting forwardly above the horizontal portion of said conveyer, a scraper blade mounted on said frame and projecting in front of said conveyer, a shaft mounted on said machine frame and having an operating lever, crank arms secured on said shaft, rods pivotally connected with said scraper blade frame and having sliding connections with said crank arms and springs arranged on said rods and adapted to be put under tension by the depression of said crank arms, substantially as described.

In witness whereof, I have hereunto set my hand this 17th day of July 1908.

FRANK EVANS.

Witnesses:
J. A. BYINGTON,
RICHARD PAUL.